United States Patent
Sihotang

(10) Patent No.: US 10,993,200 B1
(45) Date of Patent: Apr. 27, 2021

(54) SESSION MANAGEMENT FUNCTION (SMF) DATA STORAGE IN CELLULAR NETWORK REGISTRATION

(71) Applicant: T-Mobile USA, Inc., Bellevue, WA (US)

(72) Inventor: Jhon Nelson Sihotang, Renton, WA (US)

(73) Assignee: T-MOBILE USA, INC., Bellevue, WA (US)

( * ) Notice: Subject to any disclaimer, the term of this patent is extended or adjusted under 35 U.S.C. 154(b) by 0 days.

(21) Appl. No.: 16/855,364

(22) Filed: Apr. 22, 2020

(51) Int. Cl.
| H04W 4/00 | (2018.01) |
| G06F 15/173 | (2006.01) |
| G06F 15/16 | (2006.01) |
| H04W 60/00 | (2009.01) |
| H04W 76/11 | (2018.01) |

(52) U.S. Cl.
CPC ............ *H04W 60/00* (2013.01); *H04W 76/11* (2018.02)

(58) Field of Classification Search
CPC .............................. H04W 60/00; H04W 76/11
USPC ...................................................... 455/435.1
See application file for complete search history.

(56) References Cited

U.S. PATENT DOCUMENTS

| 6,101,391 A * | 8/2000 | Ishizuka ............... H04W 64/00 455/414.1 |
| 2016/0007316 A1* | 1/2016 | Vaidya ................ H04W 64/003 370/312 |
| 2016/0226791 A1* | 8/2016 | Ramamoorthy ...... H04L 47/783 |
| 2018/0352050 A1* | 12/2018 | Li ........................... H04W 8/08 |
| 2019/0191467 A1* | 6/2019 | Dao ...................... H04W 76/10 |
| 2020/0045753 A1* | 2/2020 | Dao ........................ H04W 4/08 |
| 2020/0059761 A1* | 2/2020 | Li ........................... H04W 4/24 |

* cited by examiner

*Primary Examiner* — Mark G. Pannell
(74) *Attorney, Agent, or Firm* — Loeb & Loeb, LLP

(57) ABSTRACT

A system and method may improve latency for user equipment (UE) registration in cellular networks. UE registration may retrieve the UE's Session Management Function Data locally rather than from a network or cloud-based unified data management (UDM) entity that manages a unified data repository (UDR). For example, the UE may send a unique identification (e.g., a UE ID) for the UE to a registering entity of a cellular network system. The UE ID may then be used to identify a UE Group Identification for the UE at the UDM. The UE Group Identification may be a pointer to the locally-stored Session Management Function Data for the UE. The entity requesting registration may then use the pointer to retrieve the Session Management Function Data locally rather than a remote entity such as the UDM.

20 Claims, 4 Drawing Sheets

SESSION MANAGEMENT FUNCTION (SMF) DATA STORAGE IN CELLULAR NETWORK REGISTRATION

BACKGROUND

The background description provided herein is for the purpose of generally presenting the context of the disclosure. The work of the presently named inventors, to the extent it is described in this background section, as well as aspects of the description that may not otherwise qualify as prior art at the time of filing, are neither expressly nor impliedly admitted as prior art against the present disclosure.

Fifth Generation or "5G" cellular networks offer significant improvements over earlier cellular network designs including much higher data rates (1-20 Gigabits per second), much lower data latency (e.g., 1 millisecond), and increased capacity as the network expands. 5G consists of an array of technologies to meet these goals including antenna and cellular tower design, a larger frequency spectrum, and software implemented by various carriers to improve the capabilities of their subscribers. For example, carriers may modify any one of the processes involved in cellular network management (e.g., user equipment (UE) registration, etc.) to make slight improvements in data rates, latency, or network capacity that, collectively, contribute significant improvements in cellular network improvements.

One aspect of 5G networks is Unified Data Management (UDM). Unified data management (UDM) manages network user data in a single, centralized element. UDM is similar to the subscriber service (HSS) from previous cellular network generations, but is cloud-native and specifically designed for 5G. It can be paired with the user data repository (UDR) which stores the user data such as customer profile information, customer authentication information, and encryption keys for the information. UDM resides on the control plane (e.g., 5G protocols for controlling the connection between the UE and the network) and utilizes "microservices" or lightweight, distributed applications based on software components that work across the cloud, to communicate between the user plane and the control plane.

Typical UE registration in 5G networks is described in detail by Unified Data Management Services specification 3GPP TS 29.503 (available at: https://portal.3gpp.org/desktopmodules/Specifications/SpecificationDetails.aspx?specificationId=3342). 3GPP TS 29.503 describes that data such as the Session Management Function Data (e.g., Selection Subscription Data, Session Management Subscription Data, Data Network Name (DNN) array, etc.) are stored in UDM and downloaded to the SMF during the registration process. The Session Management Function Data typically accounts for at least 50 KB of data for each UE and includes groups of subscribers that have identical data. The Session Management Function for each UE is stored in UDM even if it is identical to other data stored elsewhere in UDM for other UE. Thus, massive amounts of redundant data may be stored in UDM. Further, the UE registration process requires that the SMF download the Session Management Function Data for each UE. Further, the transfer of the Session Management Function Data from UDM to SMF or other entities during registration will consume additional time and bandwidth.

SUMMARY

The following presents a simplified summary of the present disclosure in order to provide a basic understanding of some aspects of the disclosure. This summary is not an extensive overview. It is not intended to identify key or critical elements of the disclosure or to delineate its scope. The following summary merely presents some concepts in a simplified form as a prelude to the more detailed description provided below.

In an embodiment, Session Management Function Data may be stored locally in the SMF rather than the UDM and the typical UE registration process may include a request to the SMF, rather than the UDM, for data consisting of a pointer to the Session Management Function Data for the particular UE. That pointer may then direct the UE registration process to the local Session Management Function Data in SMF.

A system for registering a user equipment (UE) with a base station in a cellular network may include a Unified Data Management (UDM) entity having a processor and a memory storing instructions for execution by the processor. In some embodiments, the instructions may be for receiving a user equipment identification (UE ID) for the user equipment, matching the UE ID to a user equipment group identification (UE Group ID) at a remote unified data management entity (UDM), and sending the UE Group ID to the base station in response to the UE ID. The system may also include a Session Management Function (SMF) entity including a processor and a memory storing instructions for execution by the processor. In some embodiments, the instructions may be for receiving the UE Group ID, and matching the UE Group ID to locally-stored Session Management Function Data. In response to matching the UE Group ID to locally-stored Session Management Function Data, the base station may register the UE with the cellular network using the locally-stored Session Management Function Data.

A computer-implemented method for registering user equipment (UE) with a base station in a cellular network may include receiving a user equipment identification (UE ID) for the user equipment and matching the UE ID to a user equipment group identification (UE Group ID). The method may then send the UE Group ID to the base station in response to the UE ID where it is received by a Session Management Function entity. The method may then match the UE Group ID to locally-stored Session Management Function Data at the SMF entity. In response to matching the UE Group ID to locally-stored Session Management Function Data, the method may register the UE with the cellular network using the locally-stored Session Management Function Data.

BRIEF DESCRIPTION OF THE DRAWINGS

The figures depict a preferred embodiment for purposes of illustration only. One skilled in the art may readily recognize from the following discussion that alternative embodiments of the structures and methods illustrated herein may be employed without departing from the principles described herein.

DETAILED DESCRIPTION

The present application describes embodiments including various elements that are present in a mobile telecommunications network such as modules, blocks, functions, data structures, etc. These elements are not an exhaustive collection of all elements needed to perform the functions of a mobile telecommunications network (i.e., UE registration) or the disclosed embodiments. Indeed, the elements associated with the systems and methods described in this application are only some of the possible elements that are needed to implement the embodiments. Some embodiments may include more or fewer elements than those that are described with the embodiments, as known by a person having ordinary skill in the art of mobile telecommunications systems.

The present application describes a technical solution to the technical problem of latency during user equipment (UE) registration in cellular networks. The present application solves this technical problem by modifying the typical UE registration process so that it no longer relies on retrieving the UE's Session Management Function Data from a network or cloud-based unified data management (UDM) entity that manages a unified data repository (UDR). Instead, the UE sends a unique identification (e.g., a UE ID) for the UE to the Subscription Management Function (SMF) to initiate registration. The identification is a pointer to the Session Management Function Data stored in the SMF or otherwise locally at the base station for the UE. The SMF then uses the pointer to retrieve the Session Management Function Data locally (e.g., from the SMF or other local entity), rather than a remote entity such as the UDM. In this way, the present application removes the latency in UE registration that is caused by retrieving the Session Management Function Data through the UDM from the cloud-based UDR.

In some embodiments, the UE ID may be a subscriber identification or SUP I, a Permanent Equipment Identifier or PEI, a Globally Unique Temporary Identifier or GUTI, a subscription concealed identifier or SUCI, an Internal Group Identifier, a General Public Subscription Identifier, an access point name (APN) or a data network name (DNN) linked to its IP address, etc. For example, the UE may have several IP addresses (or IPv6 prefixes) at once (i.e., one for Internet access and one for operator services such as Voice over LTE (VoLTE), etc.). Each address may be bound to a different virtual network interface on the UE. In this case, several protocol data unit (PDU) sessions may be established simultaneously. A PDU may be is a single unit of information transmitted among peer entities of the system 100. Each UE IP address may be identified with a (human readable) name which in 2G, 3G and 4G networks was referred to as the APN (Access Point Name). In the 5G core, it is referred to as the DNN (Data Network Name).

Figure 1:
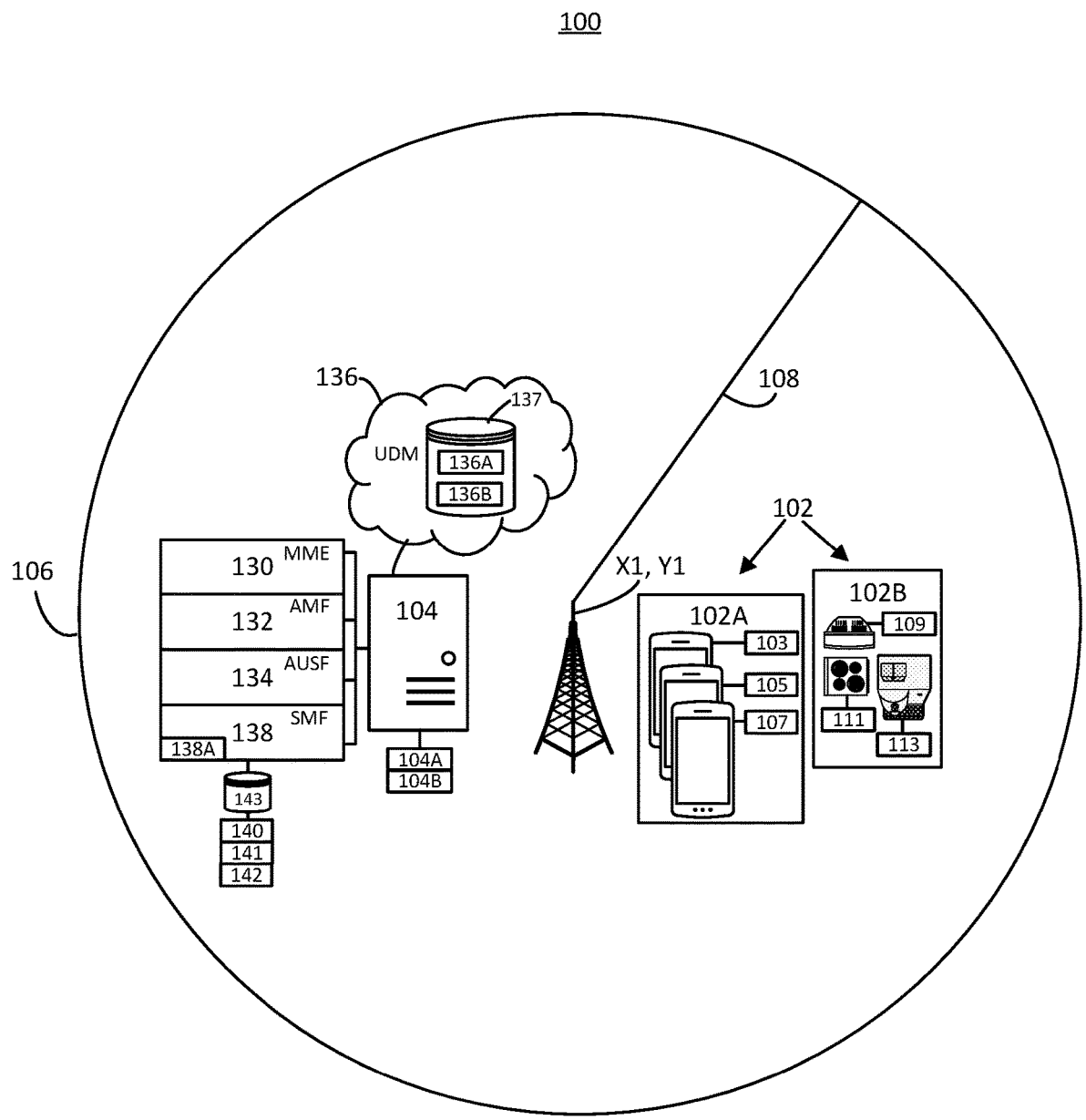
FIG. 1 is an illustration of an exemplary system for registering user equipment (UE) without retrieving Session Management Function Data for the UE from a remote unified data management (UDM) entity in accordance with the current disclosure.

FIG. 1 illustrates a system 100 supporting operation of user equipment (UE) 102 in a cellular communication system generally and, in particular, facilitating a computer-implemented process for registering the UE 102 with the system 100 as described herein. The UE 102 may be any electronic device that is capable of sending and/or receiving a radio signal for communicating data from the UE 102 to other UEs (not shown) via the system 100. In some embodiments, the UE 102 includes a cellular telephone, a smartphone, a smart watch, an Internet of Things device, a computing device, etc. The UE 102 may be categorized or grouped along various characteristics including device capabilities and network services. For example, in some embodiments, the UE 102 may include a smartphone UE group 102A, an Internet of Things UE group 102B, etc.

Each individual UE 102 may include a user equipment identifier (UE ID) (e.g., 103, 105, 107, 109, 111, 113) and each UE 102 may belong to one or more of the UE groups (e.g., UE group 102A, UE group 102B, etc.) each having its own user equipment group identification (UE Group ID 136A, 136B, respectively). Thus, each UE 102 may include its own UE ID and belong to a group of UEs having a single UE group ID associated with all UEs that are members of the group. The system 100 may include processor-executable instructions to identify locally-stored session Management Function data (i.e., one or more of Selection Subscription Data 140, Session Management Subscription data 141, and a Data Network Name Array 142) based on a received UE ID corresponding to a UE group ID 136A, 136B. In some embodiments, the UE ID (103, 105, 107, 109, 111, 113) may be used by the UDM 136 to identify a UE group ID 136A, 136B that corresponds to the UE ID and pass that UE group ID to a system entity. The system entity that receives the UE group ID in response to passing the UE ID to the UDM 136 may include processor-executable instructions to retrieve the locally-stored Session Management Function Data 140, 141, 142 for registration of the UE rather than passing the Session Management Function Data 140, 141, 142 directly from the UDM to the requesting entity. The Session Management Function Data 140, 141, 142 may include Access and Mobility Subscription Data (e.g., Mobility Subscription data, SMF selection data, UE context in SMF data, Radio Access Technologies (RAT) Restriction data, Area Restriction data, Core Network Type restriction data, Data Network name data, etc.).

A base station 104 may be maintained by a mobile network operator (MNO) corresponding to the UE 102. The network base station 104 may include a processor 104A and a memory 104*b* storing processor-executable instructions and data to facilitate a UE authentication and registration process, as described herein. The network base station may also include processor-executable instructions to facilitate the MNO registering UEs and maintaining the network. For example, the memory 104B may include data to define a coverage area 106 having a center point X1, Y1 and having a radius 108. The base station 104 may also have one or more radios supporting communication with the UE 102. The base station 104 may also include one or more radios operating at different frequency bands supporting communication with the UE 102 as well as other processors and memories storing processor-executable instructions for implementing the various modules, blocks, functions, data structures, etc., as herein described.

The UE 102 and groups of UEs 102A and 102B (e.g., a plurality of Apple® iPhone® 10s, a plurality of Samsung® Galaxy® S20s, Internet of Things (IoT) devices, etc.) may be subscribed to a mobile network operator (MNO) that maintains the network base station 104. A subscriber may be an entity who is party to a contract with the MNO for access to public telecommunications services. Different MNOs may support different network standards and capabilities. While FIG. 1 only shows one base station 104 and two UE groups 102A, 102*b*, the embodiments described herein apply equally to systems having different numbers of base stations, corresponding MNOs, UE groups, etc. MNOs may create subscriber groups (e.g., 102A, 102B) based on product offerings where classification of subscribers by UE group ID may be required to offer different types of services.

The UE is able to maintain connectivity beyond the coverage area 106 of the network base station 104 shown in FIG. 1 despite only the network base station 104 being maintained by a network MNO having a contract for telecommunications services with a subscriber corresponding to the UE 102. For example, the UE 102 may move out of range of the coverage area 106 and into range of an adjacent coverage area corresponding to another base station.

The base station 104 may include several modules or entities (130, 132, 134, 136, 138) with processor-executable instructions for facilitating an authentication and registration process with the UE 102 and groups of UE 102A, 1026. While this disclosure describes five modules (i.e., a Mobile Management Entity (MME) 130, an Access and Mobility Management Function (AMF) 132, an Authentication Server Function (AUSF) 134, a Unified Data Management (UDM) entity 136, and a Session Management Function (SMF) 138) to facilitate the authentication and registration processes, persons of ordinary skill in the art will recognize that additional modules and functions may be required to complete these processes (see, e.g., Unified Data Management Services specification 3GPP TS 29.503 (available at: https://portal.3gpp.org/desktopmodules/Specifications/SpecificationDetails.aspx?specificationId=3342). Likewise, functionality of the module or entities may be implemented by a processor executing processor-executable instructions.

Each MNO maintains a Mobile Management Entity (MME) 130 for the respective base station 104, including a Location Register (HLR) for their base stations 104. The HLR is a database for the MNO in which information from all mobile subscribers is stored. The HLR contains information about the subscribers identity, telephone number, the associated services for the number or account, and general information about the location of the subscriber. The exact location of the subscriber is kept in a Visitor Location Register (VLR), as described below. The MME 130 is the key control node for the system 100 providing mobility and session management in 4G systems. The MME 130 includes instructions for idle mode paging and tagging procedure including retransmissions for the UE 102. The MME 130 also includes instructions for activation/deactivation processes and also instructions for choosing the gateway and base station for the UE 102 at the initial attach and at the time of intra-LTE handover involving Core Network (CN) node relocation. The MME 130 also includes instructions for authenticating the user by interacting with the respective base station 104.

In 5G systems, the Access and Mobility Management Function (AMF) 132 may serve part of the role of the MME 130 (i.e., mobility management). The AMF 132 may maintain a Non-Access Stratum (NAS) signaling connection with the UE 102 and manage the UE registration procedure. The AMF 132 may also be responsible for paging. In some embodiments, the AMF 132 may include instructions to store configuration and subscription data for the UE 102 in a local configuration and subscription data repository.

Subscriber authentication, during registration or re-registration with 5G, may be managed by the Authentication Server Function (AUSF) 134. The AUSF may include processor-executable instructions 134A for managing subscriber authentication during 5G registration. In some embodiments, during registration of the UE 102, the AUSF may obtain various data or authentication vectors from a local data repository (e.g., Session Management Function Data 140, 141, 142 from the Session Management Function data repository 143, etc.). The Session Management Function Data 140, 141, 142 may include one or more of SMF Selection Subscription Data and Session Management Subscription Data, including a Data Network Name array, and other data needed to complete the authentication and registration processes of various UE 102 and groups of UE 102A, 102B. Retrieving the Session Management Function Data 140, 141, 142 from the local repository 143 differs from typical 5G authentication and registration procedures that retrieve similar data from network storage and/or the cloud-based UDM 136.

A Session Management Function (SMF) 138 may provide session management functionality in 5G systems as well as some control plane functions. The SMF 138 may include instructions 138A to allocate IP addresses to the UE 102 and groups of UE 102A, 102B during a registration process. The SMF 138 is primarily responsible for interacting with the decoupled data plane, creating, updating, and removing Protocol Data Unit (PDU) sessions and managing session context with the User Plane Function (UPF).

During registration of UE with the base station 104, the AMF 132 may receive registration requests from UE and handle anything to do with connection or mobility management while forwarding session management requirements to the SMF 138. Rather than querying the UDM 136 as in typical registration procedures, the AMF may determine which SMF is best suited to handle the connection request by querying a local data repository, such as a Session Management Function (SMF) data repository 143, rather than the UDM 136. The UDM 136 may be stateless and store information externally in a Unified Data Repository (UDR) 137. Methods and entities for the UDM 136 to use services may be specified in 3GPP TS 29.504 and 3GPP TS 29.505 to retrieve configuration and subscription data and Session Management Function Data from the UDR 137 (available at https://portal.3gpp.org/desktopmodules/Specifications/SpecificationDetails.aspx?specificationId=3405 and https://portal.3gpp.org/desktopmodules/Specifications/SpecificationDetails.aspx?specificationId=3406, respectively).

Current registration methods retrieve group Session Management Function Data 140, 141, 142 from the UDR 137 for each UE 102 that registers with the system 100. The retrieved data is then stored locally before, during, or after processing an incoming UE registration request. In some embodiments, the SMF 138 may include instructions 138A to retrieve group Selection Subscription Data 140, Session Management Subscription data 141, and a Data Network Name Array 142 for registration from a local SMF data repository 143. Processing the incoming request may then include updating one or more of the Selection Subscription Data 140, Session Management Subscription data 141, and Data Network Name Array 142 in the SMF data repository 143 or subscribing to change notifications at the SMF data repository 143 by consuming the appropriate services. In further embodiments, the SMF 138 may also include instructions to perform the role of Dynamic Host Configuration Protocol (DHCP) server and IP Address Management (IPAM) system. Further, the SMF data repository 143 may maintain a record of Protocol Data Unit (PDU) session state by means of a 24 bit PDU Session ID. The SMF may also set configuration parameters that define traffic steering parameters and ensure the appropriate routing of packets while guaranteeing the delivery of incoming packets, though a Downlink (DL) data notification. The SMF 138 also includes instructions to check whether the UE requests are compliant with the user subscription and for connectivity charging, which is achieved by interacting with a Charging Function (CHF).

Processing and network latency during UE registration may be reduced by a modified registration process in which only a UE group ID (136A, 136B) is retrieved from the UDR 137 rather than the entirety of the Session Management Function data 140, 141, 142 for each UE that registers with the system 100. In some embodiments, the UDM 136 generally and the UDR 137 in particular, or other entities of the system 100, may include processor-implemented instructions to store a group ID 136A, 136B associated with each UE group 102A, 102B, respectively, in the UDR 137. A billing system or other entity associated with an MNO may set each group identification. For example, the processor-implemented instructions may include storing a consumer UE group ID 136A that also identifies a consumer UE group 102A and a IoT UE group ID 137A that is associated with each UE within a IoT UE group 102б. While FIG. 1 illustrates two examples of group IDs, the UDR 137 may include various other IDs as determined by the MNO (e.g., a Mobile Virtual Network Operator group having an identification for UE corresponding to the group, etc.).

Each UE Group ID 136A, 136б may be a pointer to the Session Management Function Data 140, 141, 142 corresponding to the group UE. Session Management Function Data 140, 141, 142 for each UE within a UE group 102A, 102B may be stored locally. For example, the system 100 may include processor-executable instructions to store Session Management Function Data 140, 141, 142 for the UE groups 102A, 102б at the SMF data repository 143 for the entity requesting the data for registration or other operations of the system 100. The Session Management Function Data 140, 141, 142 may be stored locally with the SMF 138, or other entity. One or more entities of the system 100 may include instructions to pass its UE ID (103, 105, 107, 109, 111, 113; subscriber identification or SUPI, a Permanent Equipment Identifier of PEI, a Globally Unique Temporary Identifier or GUTI, a subscription concealed identifier or SUCI, an Internal Group Identifier, a General Public Subscription Identifier, an access point name (APN) or a data network name (DNN) linked to its IP address, etc.) to various entities of the system 100 (e.g., one or more of the Mobile Management Entity (MME) 130, the Access and Mobility Management Function (AMF) 132, the Authentication Server Function (AUSF) 134, the Session Management Function (SMF) 138, etc.). The system 100 may cause a processor to execute these instructions when a UE 102 attempts registration with the system 100. The system 100 may include further instructions to identify the UE group using the received UE ID. For example, the SMF may include instructions to receive a UE ID during or in response to registration of the UE. The SMF may include processor-executable instructions to pass the UE ID to the UDM. The UDM 136 may include further processor-executable instructions to identify the UE group for the registering UE based on or in response to the received UE ID and pass the UE group ID back to the system entity (i.e., the SMF 138). The SMF 138 or other system entity may include further instructions to use the received UE group ID to access and apply locally-stored Session Management Function Data 140, 141, 142 for the registering UE corresponding to that UE group ID.

Figure 2:
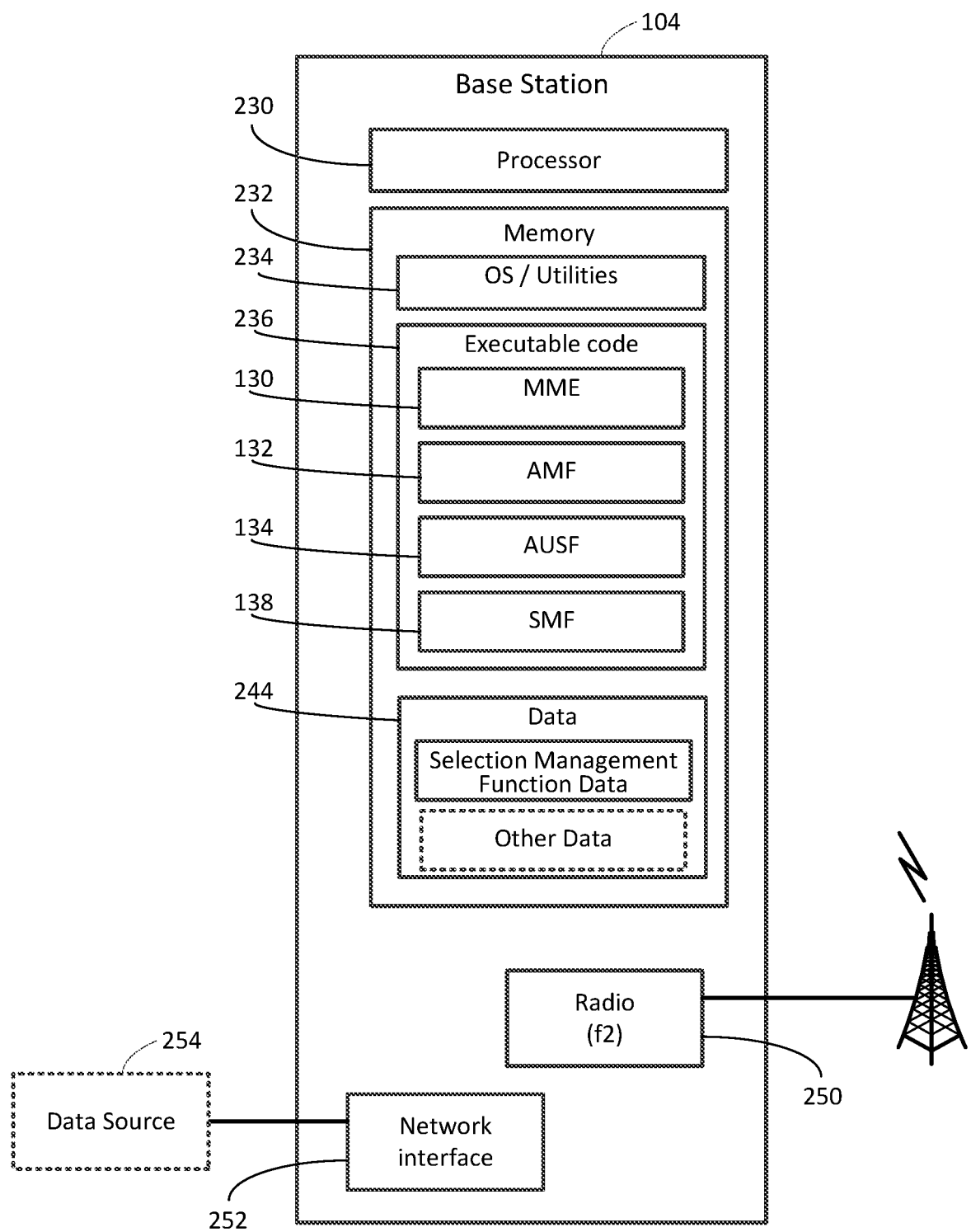
FIG. 2 is an illustration of an exemplary base station in accordance with the current disclosure.

FIG. 2 illustrates an exemplary block diagram of a base station 104 in accordance with the current disclosure. The base station 104 may include a processor 230 that is in communication with a memory 232. The memory 232 may include an operating system and utilities 234 used to manage operations of the base station including booting, memory management, communications, UE registration, error handling, software updates, etc. The memory 232 may also store processor-executable instructions 236 and data 244.

The base station 104 may have a radio 250 operating at a frequency band that provides for a coverage area 106 (FIG. 1) larger than that of another frequency band in use by the network base station 104. For example, another base station may operate in a frequency band in the 700 MHz frequency range with a larger coverage radius. In many prior art systems, wide area coverage was provided by an overlapping network of similar band radios, operating at up to 2.5 GHz, but having similar coverage areas. 4G LTE is such an example. In such systems, the UE 102 may tell one base station when it is getting a stronger signal from another base station so that a handoff between base stations can be executed.

However, in the new 5G (fifth generation cellular) standard, a mixed system of low band (e.g., 700 MHz base stations) may be intermixed with millimeter wave radios operating in frequency bands around 50 GHz. These so called NR (new radio) radios may have a coverage radius of 500 meters or less depending on terrain and other obstructions. Unlike previous systems, the 5G implementation mixes these bands with significantly different coverage areas. The base station 104 may also include a network interface 252 used for routing traffic from land-based switch gear (not depicted). The network interface 252 may also communicate with an external data source 254.

The executable instructions 236 may include various modules or routines that are used for registering UE and sharing Session Management Function Data 140, 141, 142 among UE group members for registration with the base station 104 as described herein. For example, in an embodiment, the memory 232 may include one or more of the MME 130, the AMF 132, the AUSF 134, and the SMF 138. The data 244 may include Session Management Function Data 140, 141, 142 (e.g., Selection Subscription Data 140, Session Management Subscription data 141, and a Data Network Name Array 142, etc.). The data 244 may also include coverage coordinates or descriptors, capabilities (e.g., 2G, 3G, 4G, or 5G, narrow band, etc.) of the coverage areas of the base stations and coverage coordinates for other base stations (not depicted) having small coverage areas compared to that of the other network base stations.

Figure 3:
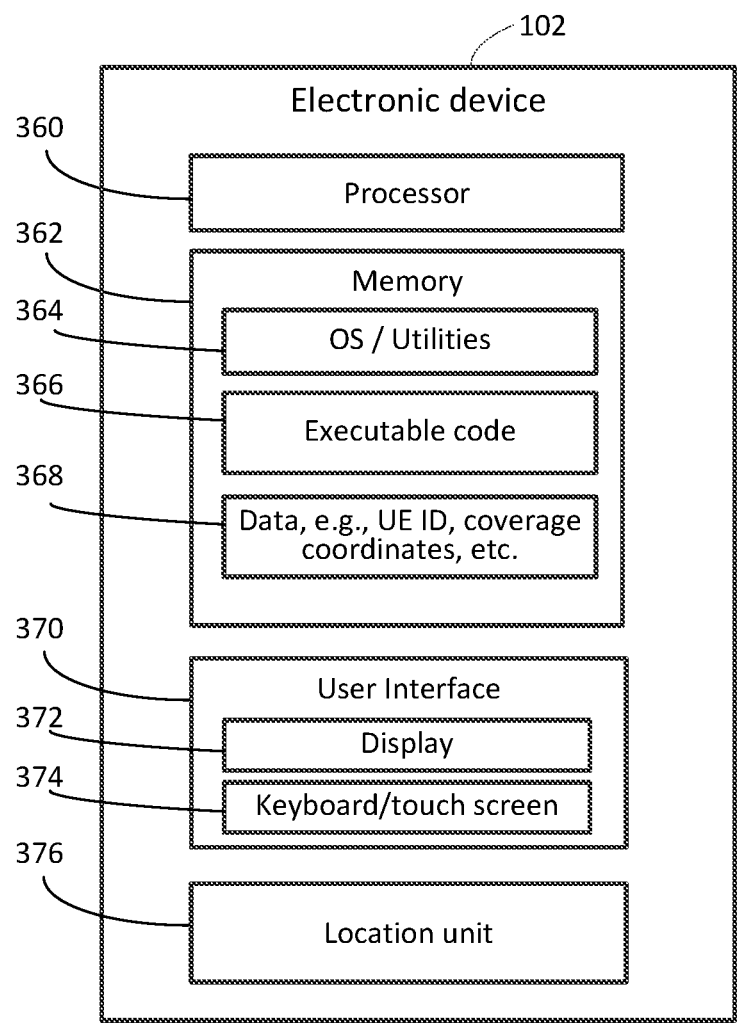
FIG. 3 is an illustration of user equipment in accordance with the current disclosure.

An embodiment of a UE 102 may be illustrated in FIG. 3. The UE 102 may be a cellular telephone, a tablet, a laptop, IoT device, etc. In other cases, the UE 102 may be any of a number of items that increasingly rely on network connectivity, such as a smartphone, internet of things device, vehicle, or other device. The UE 102 may include a processor 360 and memory 362 including an operating system and utilities 364, executable code 366 that may include both native and downloaded applications, and data memory 368. The data memory 368 may include a UE ID (e.g., subscriber identification or SUPI, a Permanent Equipment Identifier of PEI, a Globally Unique Temporary Identifier or GUTI, a subscription concealed identifier or SUCI, an Internal Group Identifier, a General Public Subscription Identifier, an access point name (APN) or a data network name (DNN) linked to its IP address, etc.) and specific device capabilities, such as coordinates or a descriptor as described above. The UE 102 may also include a user interface 370 that itself may incorporate a display 372 and input device 374 such as a keyboard or touchscreen.

The user interface 370 may be in communication with another module that includes processor-executable instructions to provide information to a user regarding the availability and/or activity on available base stations. For example, when a user is near a 5G cell that is available via the roaming plan, a map may be displayed via the display 372 showing the user the location of the cell along with the user's location and availability of locally-stored Session Management Function Data to complete registration with the cell. That way, the user may decide whether to travel to the cell should it provide a desirable performance or cost benefit. Similarly, the module may include instructions to persuade a user to move from one network to another when device capabilities and roaming agreements permit. For example, processor-executable instructions may present a benefit (i.e., billing reduction, minutes boost, data availability boost, etc.) to switch between available networks that meet the subscriber's device capabilities based on bandwidth availability (e.g., from a low-bandwidth-available 5G network to a high-bandwidth-available 3G network when conditions permit) or may match locally-stored Subscription Management Function data 140, 141, 142 for faster registration operations with the corresponding base station.

A location unit 376 may include a GPS receiver but may also rely on cell tower triangulation, Wi-Fi positioning (WPS), or other location techniques. Unlike the currently disclosed system, Wi-Fi positioning may require a mobile device to constantly monitor for Wi-Fi SSID and MAC addresses and use those with an external database to infer the location of the device from the location the Wi-Fi access point.

The illustrated examples above are simplified for convenience and ease of understanding. It should be understood that more complex arrangements of cellular networks are likely, including multiple cells with varying coverage areas and multiple different types of UE and UE groups with the Session Management Function Data 140, 141, 142 stored for local access during registration based on an association between each UE ID and a UE group ID to identify and access the locally-stored Session Management Function Data 140, 141, 142 during registration of the UE 102 on the system 100.

Figure 4:
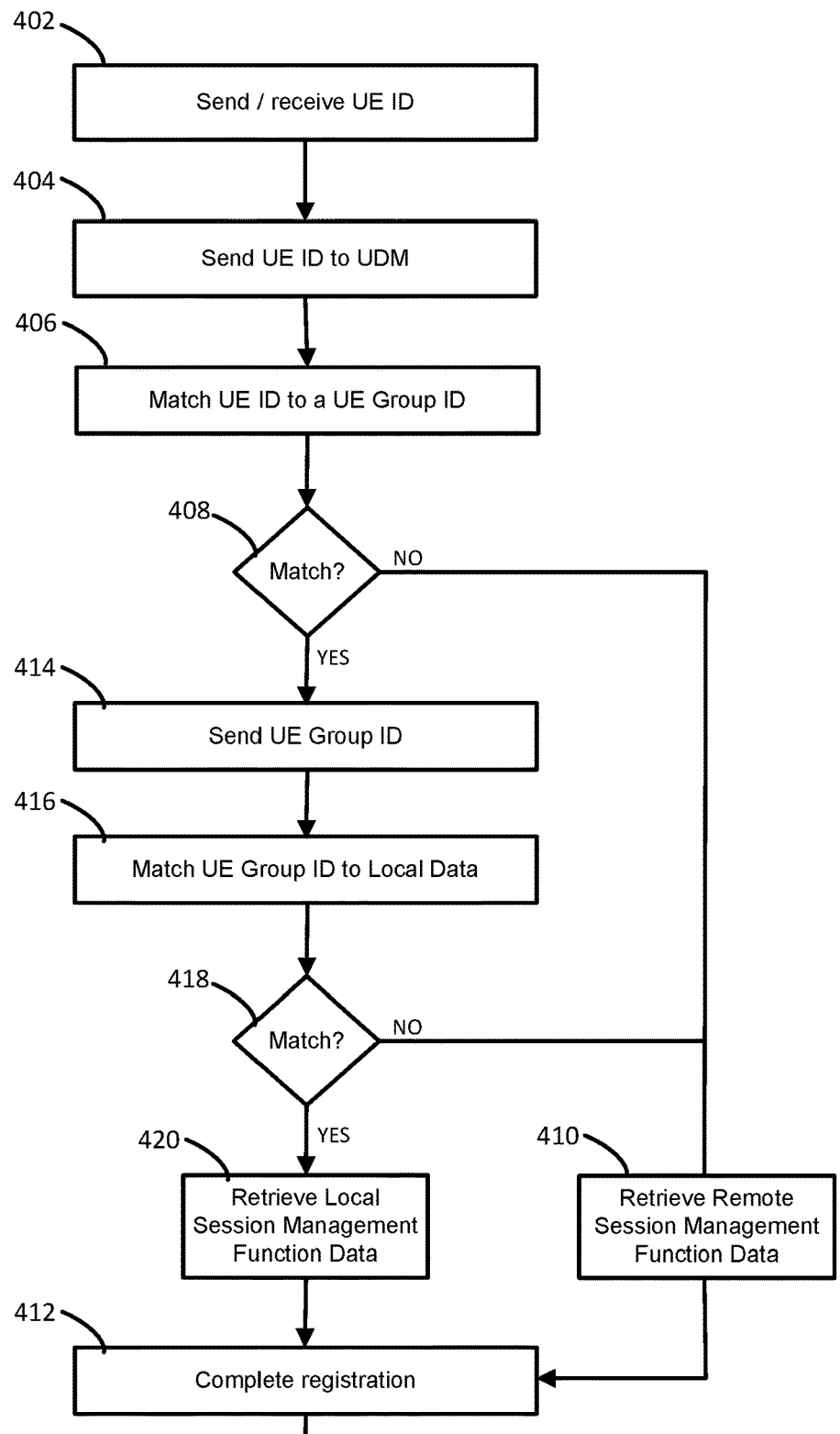
FIG. 4 is an illustration of a flow chart for a method for registering user equipment (UE) without retrieving Session Management Function Data for the UE from a remote unified data management (UDM) entity in accordance with the current disclosure.

FIG. 4 is a flowchart of a computer-implemented method 400 for completing one or more processes for registering a UE 102 with a cellular network base station 104. As described herein, Session Management Function Data 140, 141, 142 for each of a plurality of UE groups 102A, 102B may be stored locally (e.g., in the SMF data repository 143 or other local entity of the base station 104) rather than the UDR 137 of a UDM 136. Rather than requesting the Session Management Function Data 140, 141, 142 from the UDM 136, the computer-implemented method 400 may include a request to the UDM 136 for a UE group ID 136A, 136B based on a UE ID (103, 105, 107, 109, 111, 113) received at the base station 104 from the registering UE 102. The UE Group ID 136A, 136B sent from the UDM 136 in response to the UE ID may be a pointer to the locally-stored Session Management Function Data 140, 141, 142 for the particular UE. That pointer may then direct the computer-implemented method 400 to the local Session Management Function Data 140, 141, 142 to be used during the registration processes between the UE 102 and the base station 104.

Each step of the method 400 is one or more computer-executable instructions (e.g., modules, blocks, stand-alone instructions, etc.) performed on a processor of a server or other computing device (e.g., base station, electronic device, other computer system illustrated in FIG. 1 and/or described herein) which may be physically configured to execute the different aspects of the method. Each step may include execution of any of the instructions as described in relation to the system 100 as part of the cellular network registration systems and methods described herein or other component that is internal or external to the system 100. While the below blocks are presented as an ordered set, the various steps described may be executed in any particular order to complete the methods described herein.

At block 402, the computer-implemented method 400 may initiate a registration process by causing a processor to execute instructions to send or receive a UE ID (i.e., 103, 105, 107, 109, 111, 113) to the base station 104. In some embodiments, the UE ID may be a subscriber identification or SUPI, a Permanent Equipment Identifier of PEI, a Globally Unique Temporary Identifier or GUTI, a subscription concealed identifier or SUCI, an Internal Group Identifier, a General Public Subscription Identifier, an access point name (APN) or a data network name (DNN) linked to its IP address, etc. In some embodiments, the SMF 138 may receive the UE ID and use it to retrieve the locally-stored Session Management Function data 140, 141, 142 and verify whether a UE request is compliant with a user subscription.

At block 404, the computer-implemented method 400 may cause a processor to execute instructions to forward the UE ID to a UDM 136 in response to receiving the UE ID. Unified data management (UDM) 136 may manage network UE data in a single, centralized element. UDM is similar to the subscriber service (HSS) from previous cellular network generations, but is cloud-native and specifically designed for 5G. It may be paired with the user data repository (UDR) 137 which stores a table or other data element to facilitate matching the UE ID (e.g., 103, 105, 107, 109, 111, 113) with a UE group ID (136A, 136B). In some embodiments, a processor may execute instructions 138A of the SMF 138 to send a registration request to the UDM 136. In some embodiments, the instructions 138A may include a registration request via a service-based interface (e.g., "Nudm") with the UDM 136.

At block 406, the computer-implemented method 400 may cause a processor to execute instructions to match a UE group ID 136A, 136B with the UE ID (e.g., 103, 105, 107, 109, 111, 113). In some embodiments, the processor may execute the instructions in response to receiving the UE ID at block 404.

At block 408, the computer-implemented method 400 may cause a processor to execute instructions to determine if the instructions of block 406 successfully matched the received UE ID with a UE Group ID stored in the UDR 137. If not, then the method 400 may proceed to block 410. At block 410, the method 400 may cause a processor to execute instructions to retrieve remotely-stored Session Management Function Data 140, 141, 142. In some embodiments, the method 400 may execute instructions to retrieve the Session Management Function Data 140, 141, 142 from the UDM 136 when, for example, the Session Management Function Data 140, 141, 142 is not available locally. The method 400 may then proceed to block 412 and cause a processor to execute instructions to complete registration of the UE 102.

Returning to block 408, the computer-implemented method 400 may cause a processor to execute instructions to determine if the instructions of block 406 successfully matched the received UE ID with a UE Group ID stored in the UDR 137. If there is a successful match between the received UE ID and a UE Group ID stored in the UDR 137, then the method 400 may proceed to block 414 where the method 400 may cause a processor to execute instructions to send the UE Group ID to the SMF 138 or other requesting entity of system 100.

At block 416, the computer-implemented method 400 may cause a processor to execute instructions to match the received UE Group ID (e.g., 136A, 136B) to Session Management Function Data 140, 141, 142 that is stored locally at the SMF data repository 143.

At block 418, the computer-implemented method 400 may cause a processor to execute instructions to determine if the instructions of block 416 successfully matched the received UE Group ID (e.g., 135A, 136B) with Session Management Function Data 140, 141, 142 that is stored locally in the data repository 143. If not, then the method 400 may proceed to block 410 and retrieve the remotely-stored Session Management Function Data 140, 141, 142 that corresponds to the received UE Group ID. For example, at block 410, the method 400 may cause a processor to execute instructions to retrieve remotely-stored Session Management Function Data 140, 141, 142. In some embodiments, the method 400 may execute instructions to retrieve the Session Management Function Data 140, 141, 142 from the UDM 136. The method 400 may then proceed to block 412 and cause a processor to execute instructions to complete registration of the UE 102.

Returning to block 418, in response to successful matching between the received UE Group ID (e.g., 135A, 136B) and Session Management Function Data 140, 141, 142 that is stored locally in the data repository 143, the method may cause a processor to execute an instruction to retrieve the locally-stored Session Management Function Data 140, 141, 142 at block 420.

In response to retrieving the locally-stored Session Management Function Data 140, 141, 142, the method 400 may cause a processor to execute an instruction to complete registration of the UE 102 using the data and the method 400 may end.

Thus, the present application describes a technical solution to the technical problem of latency for user equipment (UE) registration in cellular networks. The present application solves this technical problem by modifying the typical UE registration process so that it no longer relies on retrieving the Session Management Function Data 140, 141, 142 for the registering UE from remote a network or cloud-based unified data management (UDM) entity that manages a unified data repository (UDR). Instead, the UE sends a unique identification (e.g., a UE ID) for the UE to an entity of the system 100 to initiate registration. The UE ID may be a pointer to the locally-stored Session Management Function Data 140, 141, 142 for the UE. The entity requesting the Session Management Function Data 140, 141, 142 data may then use the pointer to retrieve the data locally (e.g., from the SMF), rather than a remote entity such as the UDM. In this way, the present application removes the latency in UE registration that is caused by retrieving the Session Management Function Data 140, 141, 142 remotely through the UDM from the cloud-based UDR.

Additionally, certain embodiments are described herein as including logic or a number of components, modules, blocks, or mechanisms. Modules and method blocks may constitute either software modules (e.g., code or instructions embodied on a machine-readable medium or in a transmission signal, wherein the code is executed by a processor) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a processor configured using software, the processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within an environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within an environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "some embodiments" or "an embodiment" or "teaching" means that a particular element, feature, structure, or characteristic described in connection with the embodiment is included in at least one embodiment. The appearances of the phrase "in some embodiments" or "teachings" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

Further, the figures depict preferred embodiments for purposes of illustration only. One skilled in the art will readily recognize from the following discussion that alternative embodiments of the structures and methods illustrated herein may be employed without departing from the principles described herein Upon reading this disclosure, those of skill in the art will appreciate still additional alternative structural and functional designs for the systems and methods described herein through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the systems and methods disclosed herein without departing from the spirit and scope defined in any appended claims.

The invention claimed is:

1. A system for registering a user equipment (UE) with a base station in a cellular network, the system comprising:
   a Unified Data Management (UDM) entity including a processor and a memory storing instructions for execution by the processor for:
   receiving a user equipment identification (UE ID) for the user equipment;
   matching the UE ID to a user equipment group identification (UE Group ID);
   sending the UE Group ID to the base station in response to the UE ID;
   a Session Management Function (SMF) entity including a processor and a memory storing instructions for execution by the processor for:
   receiving the UE Group ID; and
   matching the UE Group ID to locally-stored Session Management Function Data;
   wherein, in response to matching the UE Group ID to locally-stored Session Management Function Data, the base station registers the UE with the cellular network using the locally-stored Session Management Function Data.

2. The system of claim 1, wherein the UE ID includes one or more of a subscriber identification (SUPI), a Permanent Equipment Identifier (PEI), a Globally Unique Temporary Identifier (GUTI), a subscription concealed identifier (SUCI), an Internal Group Identifier, a General Public Subscription Identifier, an access point name (APN) or a data network name (DNN) linked to an IP address for the UE.

3. The system of claim 2, wherein the Session Management Function Data includes one or more of Selection Subscription Data, Session Management Subscription Data, and a Data Network Name (DNN) array.

4. The system of claim 3, wherein the instructions for receiving the UE Group ID include instructions for:
   receiving the UE Group ID in response to the UE ID; and
   sending a request for the UE Group ID corresponding to the UE ID to the UDM entity.

5. The system of claim 4, further comprising instructions for execution by the processor for storing the Session Management Function Data for the UE Group ID at a local Session Management Function Data repository of the SMF.

6. The system of claim 5, further comprising, in response to matching the UE Group ID to locally-stored Session Management Function Data, allocating an IP address to the UE.

7. The system of claim 6, further comprising, in response to matching the UE Group ID to locally-stored Session Management Function Data, creating, updating, and removing a Protocol Data Unit (PDU) session for the UE, and managing session context with a User Plane Function (UPF) for the UE.

8. The system of claim 7, wherein the UE Group ID includes a pointer to the locally-stored Session Management Function Data.

9. The system of claim 1, wherein the UE includes a cellular telephone, a smartphone, a smart watch, an Internet of Things device, and a computing device capable of sending and receiving a radio signal for communicating data from the UE to other UEs via the cellular network.

10. The system of claim 9, further comprising instructions for execution by the processor for categorizing the UE into a UE Group based on one or more of device capabilities and network services.

11. A computer-implemented method for registering user equipment (UE) with a base station in a cellular network, the method comprising:
   receiving a user equipment identification (UE ID) for the user equipment;
   matching the UE ID to a user equipment group identification (UE Group ID);
   sending the UE Group ID to the base station in response to the UE ID;
   receiving the UE Group ID at a Session Management Function (SMF) entity of the base station;
   matching the UE Group ID to locally-stored Session Management Function Data at the SMF entity; and
   in response to matching the UE Group ID to locally-stored Session Management Function Data, registering the UE with the cellular network using the locally-stored Session Management Function Data.

12. The computer-implemented method of claim 11, wherein the UE ID includes one or more of a subscriber identification (SUP I), a Permanent Equipment Identifier (PEI), a Globally Unique Temporary Identifier (GUTI), a subscription concealed identifier (SUCI), an Internal Group Identifier, a General Public Subscription Identifier, an access point name (APN) or a data network name (DNN) linked to an IP address for the UE.

13. The computer-implemented method of claim 12, wherein the Session Management Function Data includes one or more of Selection Subscription Data, Session Management Subscription Data, and a Data Network Name (DNN) array.

14. The computer-implemented method of claim 13, wherein receiving the UE Group ID includes:
   receiving the UE Group ID in response to the UE ID; and
   sending a request for the UE Group ID corresponding to the UE ID to the UDM entity.

15. The computer-implemented method of claim 14, further comprising storing the Session Management Function Data for the UE Group ID at a local Session Management Function Data repository of the SMF.

16. The computer-implemented method of claim 15, further comprising, in response to matching the UE Group ID to locally-stored Session Management Function Data, allocating an IP address to the UE.

17. The computer-implemented method of claim 16, further comprising, in response to matching the UE Group ID to locally-stored Session Management Function Data, creating, updating, and removing a Protocol Data Unit (PDU) session for the UE, and managing session context with a User Plane Function (UPF) for the UE.

18. The computer-implemented method of claim 17, wherein the UE Group ID includes a pointer to the locally-stored Session Management Function Data.

19. The computer-implemented method of claim 11, wherein the UE includes a cellular telephone, a smartphone, a smart watch, an Internet of Things device, and a computing device capable of sending and receiving a radio signal for communicating data from the UE to other UEs via the cellular network.

20. The computer-implemented method of claim 19, further comprising categorizing the UE into a UE Group based on one or more of device capabilities and network services.

* * * * *